(12) United States Patent
Gooden et al.

(10) Patent No.: US 7,690,492 B2
(45) Date of Patent: Apr. 6, 2010

(54) APPARATUS FOR DIRECTING FLUID ALONG A FLOW PATH IN A MOTOR VEHICLE TRANSMISSION

(75) Inventors: James T. Gooden, Canton, MI (US);
Norman J. Bird, Plymouth, MI (US);
Ernest R. Shedd, Plymouth, MI (US);
John W. Kimes, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 11/637,653

(22) Filed: Dec. 12, 2006

(65) Prior Publication Data

US 2008/0135370 A1 Jun. 12, 2008

(51) Int. Cl.
*F16D 13/00* (2006.01)

(52) U.S. Cl. .............................. 192/113.32; 192/113.34

(58) Field of Classification Search ................... 192/46, 192/113.3, 113.31, 113.32, 113.34, 113.35, 192/113.36, 113.5
See application file for complete search history.

(56) References Cited

U.S. PATENT DOCUMENTS

| 5,601,175 | A | * | 2/1997 | Kinoshita et al. | ...... 192/113.32 |
| 5,676,230 | A | * | 10/1997 | Awaji et al. | ............. 192/110 B |
| 6,237,727 | B1 | | 5/2001 | Tatewaki et al. | |
| 6,244,407 | B1 | | 6/2001 | Kremer et al. | |
| 6,283,265 | B1 | | 9/2001 | Hirayanagi et al. | |
| 6,347,695 | B1 | | 2/2002 | Kuhn et al. | |
| 6,401,896 | B1 | | 6/2002 | Schnepf | |
| 6,530,464 | B2 | * | 3/2003 | Ogata et al. | ............. 192/113.32 |
| 6,554,113 | B2 | | 4/2003 | Li et al. | |
| 6,615,582 | B2 | * | 9/2003 | Yamamoto et al. | ............. 60/345 |
| 6,932,207 | B2 | | 8/2005 | Gu | |
| 6,945,371 | B2 | | 9/2005 | Schmidt | |
| 6,976,567 | B2 | | 12/2005 | Kitabayashi | |
| 7,273,140 | B2 | * | 9/2007 | Joo et al. | .................... 192/3.29 |
| 2002/0162721 | A1 | | 11/2002 | Savoyard et al. | |
| 2003/0051967 | A1 | | 3/2003 | Kitaori et al. | |
| 2004/0251107 | A1 | | 12/2004 | Sefcik et al. | |
| 2006/0113157 | A1 | | 6/2006 | Ichikawa et al. | |
| 2007/0007098 | A1 | * | 1/2007 | Inaba | .................... 192/113.32 |
| 2007/0251348 | A1 | | 11/2007 | Hayes et al. | |

FOREIGN PATENT DOCUMENTS

| GB | 2042656 | 9/1980 |
| GB | 2430714 | 4/2007 |

* cited by examiner

*Primary Examiner*—David D Le
(74) *Attorney, Agent, or Firm*—David B. Kelley; MacMillan, Sobanski & Todd, LLC

(57) ABSTRACT

A component surrounding an axis for directing fluid along a flow path in a transmission for a motor vehicle. The component includes a first wall having a thickness formed with an inner surface facing the axis, and a hole spaced about the axis and extending through the thickness of the wall, and a channel formed in the wall, communicating with the hole and the inner surface, including a base having a length that extends angularly about the axis, and having a depth that increases along the length as distance from the hole decreases.

14 Claims, 5 Drawing Sheets

APPARATUS FOR DIRECTING FLUID ALONG A FLOW PATH IN A MOTOR VEHICLE TRANSMISSION

BACKGROUND OF THE INVENTION

1. Field of the Invention

This invention relates generally to supplying hydraulic fluid, such as lubricant, to a component and, in particular, to a fluid flow path in a rotating hub of clutch for a motor vehicle transmission.

2. Description of the Prior Art

The hub of a friction clutch or an overrunning clutch in an automatic transmission assembly transfers torque between an element of the clutch element and a shaft or another component that transmits torque in the assembly. In addition, such hubs carry hydraulic fluid, such as automatic transmission fluid (ATF), to lubricate and cool surfaces of the clutch, especially those surfaces that are subject to friction, fretting or chafing during in-service use. To provide fluid passageways, the hub is usually formed with a series of angularly spaced holes drilled radially through the hub thickness, through which holes fluid passes to the critical surfaces of the component. ATF fluid is continually deposited by being thrown radially outward against the inner surface of the component as the assembly operates.

Typically, hubs that are machined from a solid metal blank or forging, or by another forming method other than sheet metal forming, require machining an oil dam on the inner diameter of the hub to direct oil through radial drilled holes in order to cool the clutch and to prevent oil flow from the ends of the hub. Oil dams are, however, expensive to machine in such hubs.

Axially directed slots located at each radial hole are ineffective toward directing a sufficient volume of oil from the inside diameter of the hub to the radial holes because oil delivered to the hub inner diameter along the circumferential length of the hub between the slots will run off the end of the hub instead of flowing into the axial slots and radial holes.

There is a need in the industry, therefore, for a low cost technique that efficiently and effectively gathers and transports oil from the inner circumference of a hub to and through holes that pass through the wall thickness of a hub to facilitate lubrication and cooling of the critical surface of the component.

SUMMARY OF THE INVENTION

The hub is formed with a series of fluid channels, each having a base located at the inner radial surface of the hub where ATF, or another hydraulic fluid, is continually deposited by being thrown radially outward as the assembly rotates. Each channel has a base, whose contour collects oil along substantially the entire angular length of the inner surface between adjacent channels. The channels are formed such that they eliminate or reduce the need for machining the inner surface of the hub or race of an overrunning clutch.

Rather than using axial slots, the profile of each channel's base has the appearance of a cam, similar to that of a ratcheting, mechanical one-way clutch. The channel base directs oil to the major diameter of the channel, where a radial lube hole is located such that all oil delivered to the hub inner diameter is directed through the radial oil holes instead of only that portion of the oil contained in axial slots having a narrow angular length.

The contour of the channel's base is uniquely formed to operate with hubs that rotate in one direction only so that the end of the channel terminates at a radial hole and the depth of the channel is a maximum at the hole. Alternately, the contour of the channel's base extends is opposite angular direction from its respective hole to accommodate hubs that rotate in opposite directions. Similarly in this instance, the end of the channel terminates at a radial hole and the depth of the channel is a maximum at the hole.

A component, surrounding an axis for directing fluid along a flow path in a transmission for a motor vehicle, includes a first wall having a thickness formed with an inner surface facing the axis, and a hole spaced about the axis and extending through the thickness of the wall. A channel formed in the wall, communicates with the hole and the inner surface. The channel includes a base having a length that extends angularly about the axis, and a depth that increases along the length as distance from the hole decreases.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
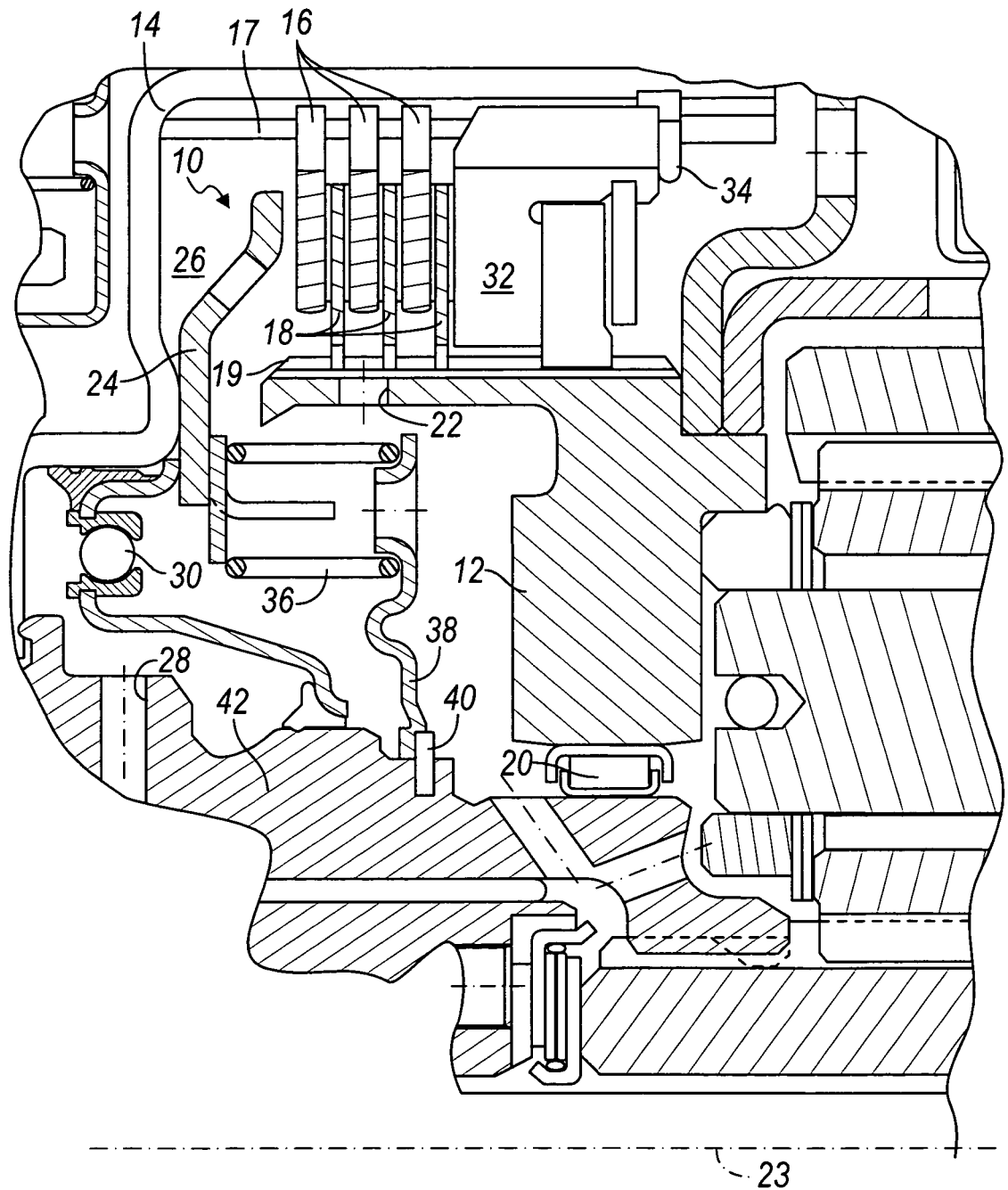
FIG. 1 is a side view showing a hydraulically actuated clutch and servo in an automatic transmission assembly.

Referring first to FIG. 1, a clutch 10 for alternately opening and closing a drive connection between a hub 12 and a drum member (also called a clutch cylinder) 14 in a hydraulically-actuated automatic transmission includes clutch plates 16, mutually spaced axially along the drum 14. The radial outer periphery of the plates 16 are connected to the drum by a spline 17 formed on the inner surface of drum 14, such that the plates and drum rotate as a unit. Located between each of the plates 16 is a friction disc 18, which is connected to the hub 12 by a spline 19 formed on the radial outer surface of the hub, such that the discs and hub rotate as a unit. The hub 12 is supported on a bearing 20 and is formed with a series of angularly-spaced radial holes 22, through which hydraulic fluid passes radially outward to the friction discs 18 and plates 16. The clutch is substantially symmetric about a longitudinal axis 23

The clutch plates 16 and friction discs 18 are forced into mutual frictional content by movement of a servo piston 24, located in a cylinder defined by drum 14. Chamber 26 is supplied with a pressurized hydraulic fluid through a passage 28 and check valve 30. When cylinder 26 is pressurized, piston 24 moves rightward forcing plates 16 and discs 18 against a pressure plate 32, which is engaged with spline 17 and is secured by a snap ring 34 to the drum 14. In this way, plates 16 and discs 18 produce a drive connection between hub 12 and drum 14. A return spring 36 continually applies to piston 24 a force that resists its movement rightward and causes the piston to move leftward to the position shown in FIG. 1, when pressure in cylinder 26 is low. The position of compression return spring 36 is fixed by a plate 38, which is secured by a snap ring 40 to a hub 42. A check valve 30 allows oil to exit the chamber 26 when pressure is low to reduce centrifugal forces from the residual oil in the chamber and ensure leftward movement of the piston 24 when intended.

Figure 2:
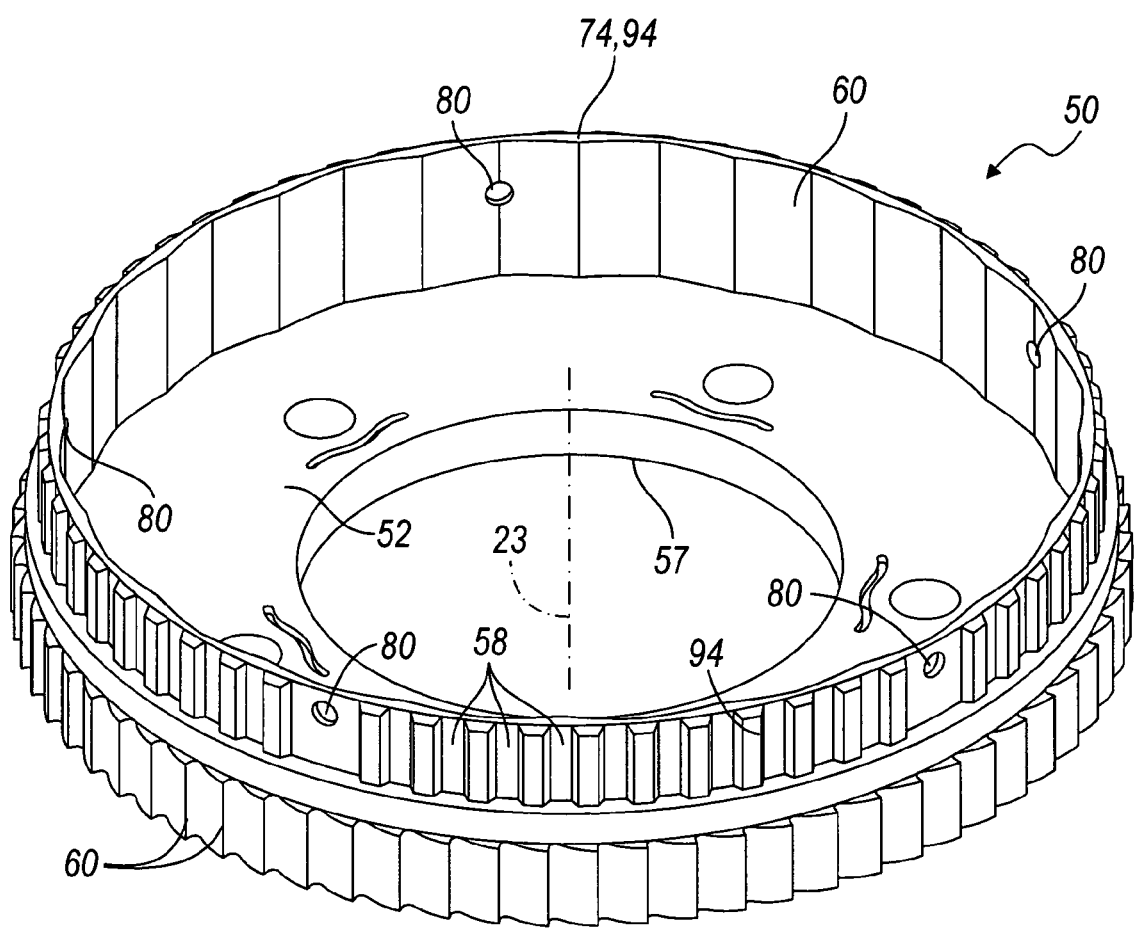
FIG. 2 is an isometric view of a clutch ring illustrating its hub and inner surfaces.

FIG. 2 is an isometric view of a ring for a one-way clutch. The ring 50 includes a hub 52, which extends angularly about axis 23, the hub being formed with angularly-spaced axial holes 56 and a large central hole 57. A portion of the outer surface of ring 50 is formed with axially directed spline teeth 58, similar to the spline teeth 17, 19, which driveably connect the plates 16 and discs 18 of clutch 10 to the drum 14 and hub 10. Another portion of the outer surface of ring 50 is formed with cam surfaces 60, which can be engaged by rockers of a one-way clutch, such as those described and illustrated in U.S. Pat. No. 7,100,756. Extending axially parallel to axis 23 and located on the radial inner surface opposite spline 58 is a surface 60 formed with profiles, which are described in detail with reference to FIGS. 3-6. A series of angularly spaced radial holes 80 pass through the axial wall 74, 94.

Figure 3:
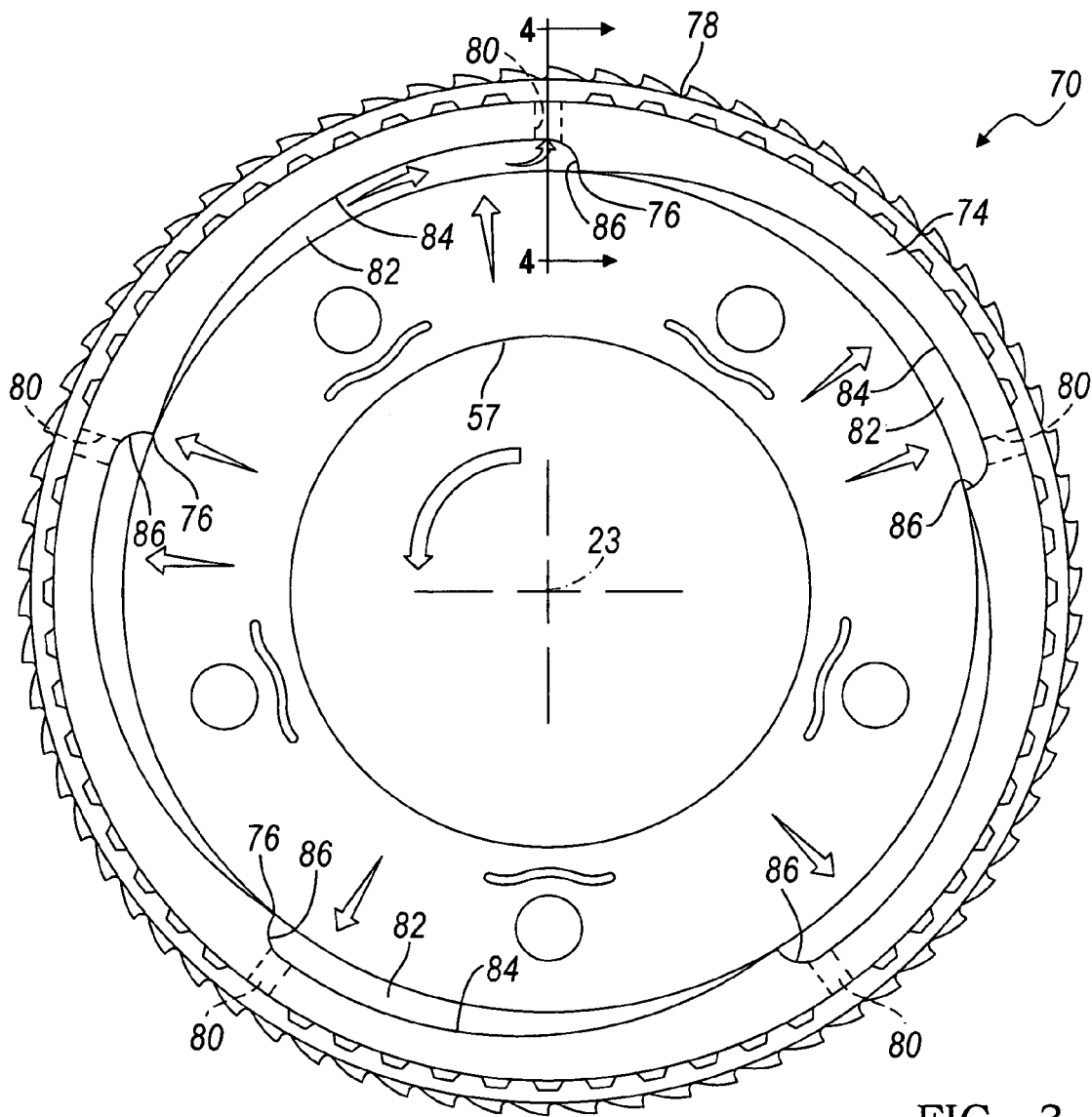
FIG. 3 is an end view of a clutch component showing a fluid channel.
Figure 4:
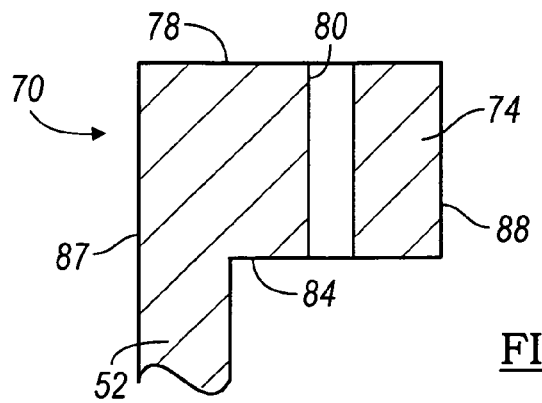
FIG. 4 is a cross section taken at plane 4-4 of FIG. 3.

Referring next to FIGS. 3 and 4, a clutch ring component 70 arranged about the central axis 23, includes a wall 74, which extends radially with respect to the axis between an inner surface 76, which faces the axis, and an outer surface 78. A series of radial holes 80, mutually angularly spaced about axis 72, extend through the wall 74.

Fluid channels 82, formed in the wall 74, are mutually spaced about axis 23. Each channel 82 includes a base 84, which extends angularly toward a respective hole 80. The depth of each channel 82, as measured by the radial distance between the inner surface 76 and the base 84, increases as the angular distance along the base from the respective hole 80 decreases. The depth of each channel 82 is a maximum at the respective hole 80.

The base 84 of each channel 82 terminates at a surface 86, which intersects both the base and the inner surface 76. Each channel 82 communicates with the respective hole 80. As FIG. 4 illustrates, at one end face 87 of wall 74, each channel 82 is closed by the radial hub 52. At the opposite axial end of face 88, each channel 82 is open to permit tool extraction so that these features can be formed by the initial manufacturing process.

In operation, preferably component 70 rotates counterclockwise about axis 23. Hydraulic fluid, thrown radially outward against inner surface 76 as the component 70 rotates, enters each channel 82 along its entire angular length between adjacent holes 80, flows in the channel toward and through the respective hole at the end of the channel 82.

Figure 5:
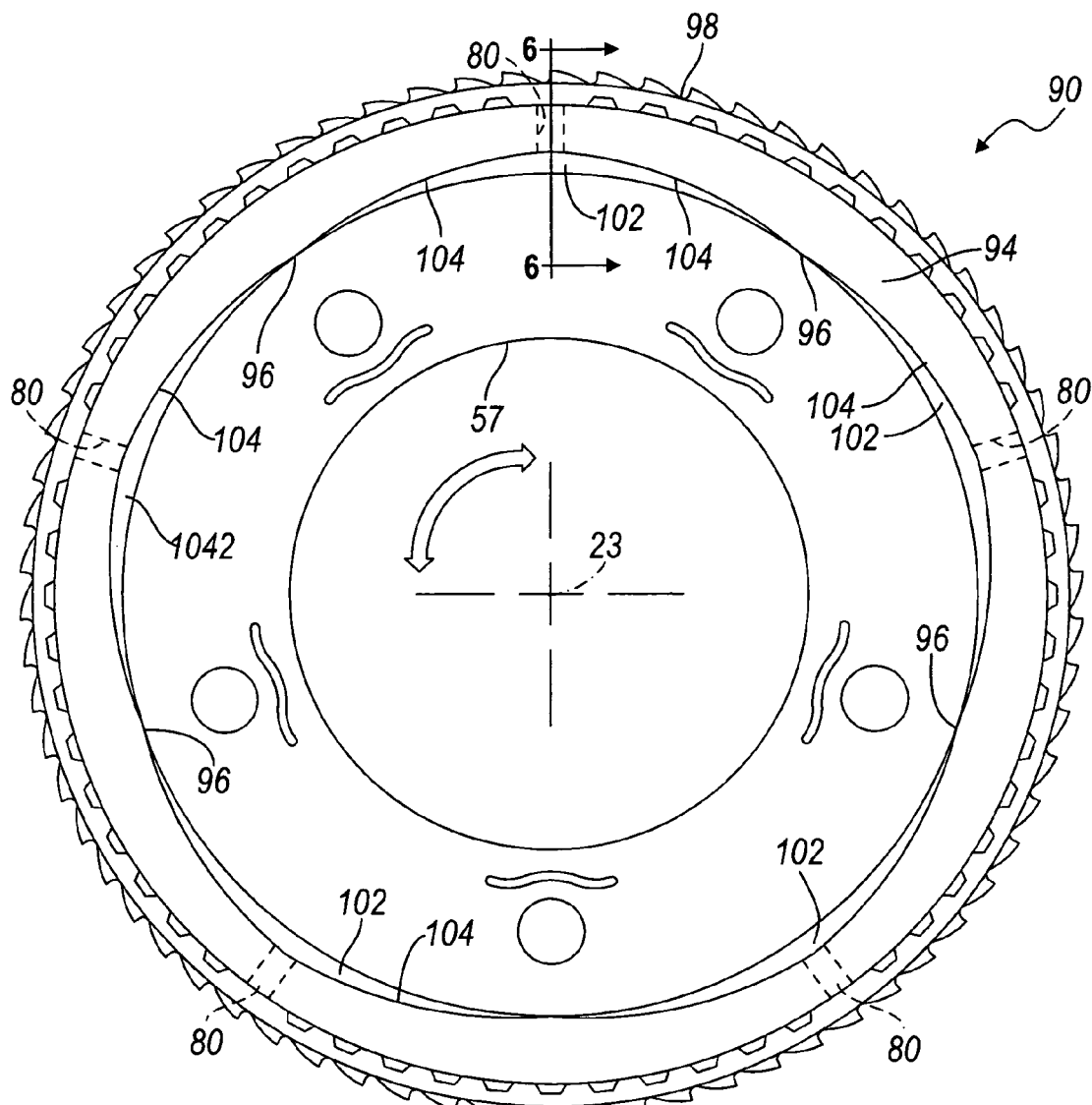
FIG. 5 is an end view of a component showing an alternate fluid channel.
Figure 6:
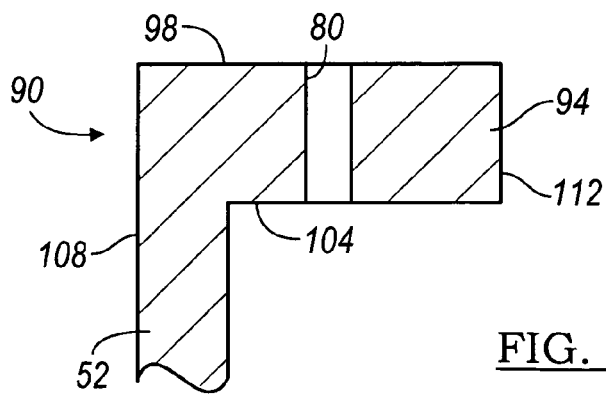
FIG. 6 is a cross section taken at plane 6-6 of FIG. 5.
Figure 7:
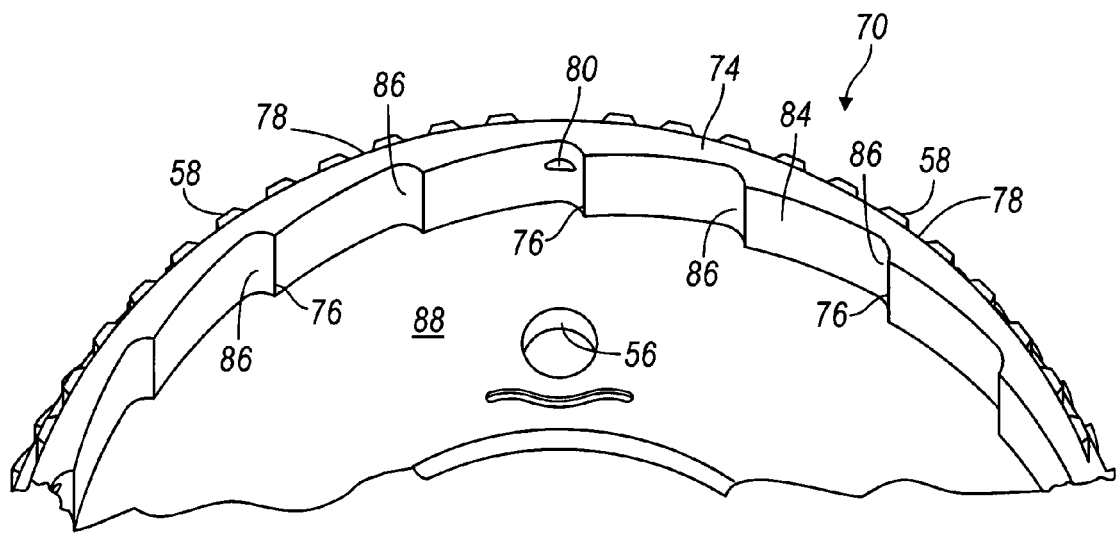
FIG. 7 is a partial isometric view illustrating the fluid channel of FIG. 3 formed on the inner surfaces of a clutch ring.
Figure 8:
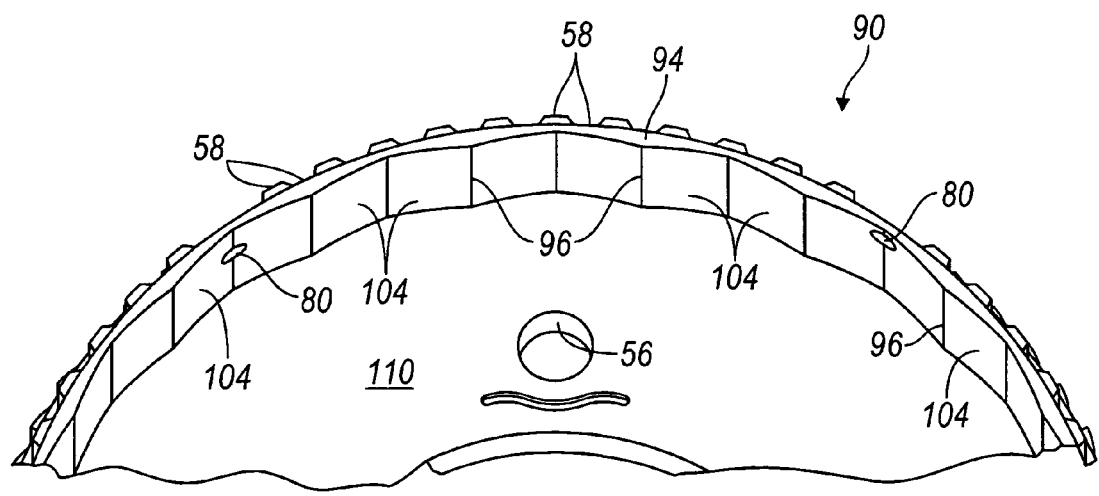
FIG. 8 is a partial isometric view illustrating the fluid channel of FIG. 4 formed on the inner surfaces of a clutch ring.

Referring to FIGS. 5 and 6, a clutch ring component 90 arranged about the central axis 23, includes a wall 94, which extends radially with respect to the axis between an inner surface 96, which faces the axis, and an outer surface 98. A series of holes 80, mutually angularly spaced about axis 23, extend radially through the wall 94.

Fluid channels 102, formed in the wall 94, are mutually spaced about axis 23. Each channel 102 includes a base 104, which extends angularly toward a respective hole 80. The base 104 of each channel 82 extends angularly on both sides of a radial line, which extends from axis 23 through the center of each hole 80, from the base of an adjacent channel to the hole of the subject channel. The depth of each channel 102, as measured by the radial distance between inner surface 96 and the base 104, increases as the angular distance along the base from the respective hole 80 decreases. The depth of each channel 102 is a maximum at the respective hole 80.

Each channel 102 communicates with its respective hole 80. As FIG. 6 illustrates, at one end face 108 of wall 94, each channel 102 is closed by radial hub 52. At the opposite axial end face 112, each channel 102 is open to permit fluid to flow into the channel along its length toward the hole 80 and though the hole to the outer surface 98.

In operation, component 90 rotates in either direction about axis 72. Hydraulic fluid, thrown radially outward against inner surface 96 as component 90 rotates, enters each channel 102 along its entire angular length between adjacent holes 80, flows in the channel in both angular directions toward and through the respective hole 80 at the end of the channel 82.

In accordance with the provisions of the patent statutes, the preferred embodiment has been described. However, it should be noted that the alternate embodiments can be practiced otherwise than as specifically illustrated and described.

What is claimed is:

1. A ring for a one-way clutch, comprising:
a wall including an inner surface facing an axis, an outer surface formed with cam surfaces, and radial holes extending through the wall to the cam surfaces; and
channels formed in the wall, each channel having a length that extends angularly about the axis, a depth that increases along the length as distance from one of the holes decreases, and including a base that is open to the axis along the entire length of the channel, an axial surface extending from the base toward the axis and along the entire length, and a terminal surface extending from the base and the axial surface and located at an end of the length at the one of the holes.

2. The ring of claim 1, wherein the base is located to block fluid thrown radially outward as the ring rotates.

3. The ring of claim 1, wherein the depth of the channel is a maximum at the hole.

4. The ring of claim 1, wherein the length of the channel extends on opposite angular sides of the hole, and the depth of the channel is a maximum at the hole.

5. The ring of claim 1 wherein the ring is supported for rotation about the axis.

6. A ring for a one-way clutch, comprising:
a wall including an inner surface facing an axis, an outer surface formed with cam surfaces, and radial holes extending through the wall to the cam surfaces; and
channels formed in the wall, each channel having a length comprising first and second lengths that extend angularly about the axis on opposite angular sides of one of the holes, a depth that increases along the first and second lengths as distance from the one of the holes decreases, and including a base that is open to the axis along the entire first and second lengths, and an axial surface extending from the base toward the axis and along the entire first and second lengths.

7. The ring of claim 6, wherein the base is located to block fluid thrown radially outward as the ring rotates.

8. The ring of claim 6, wherein the outer surface formed with spline teeth.

9. The ring of claim 6, wherein the depth of each channel is a maximum at the hole.

10. The ring of claim 6 wherein the ring is supported for rotation about the axis.

11. A hub comprising:
a wall including an inner surface facing an axis, an outer surface formed with cam surfaces, spline teeth, and radial holes extending through the wall to the spline teeth and cam surfaces; and
channels formed in the wall and extending along an entire length of the inner surface, each channel having a length that extends angularly about the axis, a depth that increases along the length as distance from one of the holes decreases, and including a base that is open to the axis along the entire length of the channel for blocking fluid thrown radially outward as the ring rotates, and an axial surface extending from the base toward the axis and along the entire length.

12. The hub of claim 11 wherein:
each channel further comprises a terminal surface extending from the base and the axial surface and located at an end of the length at the one of the holes.

13. The hub of claim 11 wherein the length of the channel extends on opposite angular sides of the hole, and the depth of the channel is a maximum at the hole.

14. The hub of claim 11 wherein:
each channel has a length further comprising first and second lengths that extend angularly about the axis on opposite angular sides of the one of the holes;
the depth increases along the first and second lengths as distance from the one of the holes decreases;
the base is open to the axis along the entire first and second lengths; and
the axial surface extends from the base toward the axis along the entire first and second lengths.

* * * * *